(12) United States Patent
Hill, III et al.

(10) Patent No.: US 11,513,099 B2
(45) Date of Patent: Nov. 29, 2022

(54) METAL LOSS SEVERITY IN MULTISTRING CONFIGURATIONS USING PIPE INSPECTION TOOLS WITH DEEP AZIMUTHAL SENSITIVITY

(71) Applicant: Halliburton Energy Services, Inc., Houston, TX (US)

(72) Inventors: Freeman Lee Hill, III, Spring, TX (US); Ahmed Elsayed Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 16/734,086

(22) Filed: Jan. 3, 2020

(65) Prior Publication Data

US 2021/0208103 A1 Jul. 8, 2021

(51) Int. Cl.
*G01N 27/90* (2021.01)
*E21B 49/00* (2006.01)
*G01N 27/904* (2021.01)

(52) U.S. Cl.
CPC ......... *G01N 27/9006* (2013.01); *E21B 49/00* (2013.01); *G01N 27/904* (2013.01); *G01N 2291/0234* (2013.01)

(58) Field of Classification Search
CPC .... G01N 27/028; G01N 17/006; G01N 27/20; G01N 27/9006; G01N 27/904; G01N 2291/0234; G01M 3/18; E21B 49/00; E21B 41/02; E21B 47/006
See application file for complete search history.

(56) References Cited

U.S. PATENT DOCUMENTS

| 3,316,179 | A | * | 4/1967 | Hoornstra | ............... C23F 11/04 134/41 |
| 6,191,586 | B1 | | 2/2001 | Bittar | |
| 10,012,753 | B2 | | 7/2018 | Nichols et al. | |
| 10,087,738 | B2 | | 10/2018 | Zhang | |
| 2011/0092181 | A1 | * | 4/2011 | Jackson | ............ G01R 29/0814 455/341 |

(Continued)

FOREIGN PATENT DOCUMENTS

WO 2019022710 A1 1/2019
WO 2019241689 A1 12/2019

*Primary Examiner* — Alvaro E Fortich
*Assistant Examiner* — Zannatul Ferdous
(74) *Attorney, Agent, or Firm* — John Wustenberg; Parker Justiss, P.C.

(57) ABSTRACT

The disclosure provides a method of evaluating wellbore casing integrity for a wellbore casing configuration. In one example, the method includes providing one or more electromagnetic signals to at least one casing of the wellbore casing configuration, receiving an electromagnetic response measurement that is based on the one or more electromagnetic signals from a selected circumferential portion of the at least one casing of the wellbore casing configuration, and processing the electromagnetic response measurement to produce a metal loss calculation for the selected circumferential portion of the at least one casing of the wellbore casing configuration. A wellbore casing integrity tool and a wellbore casing integrity computing device for evaluating wellbore casing integrity are also provided.

22 Claims, 10 Drawing Sheets

(56) References Cited

U.S. PATENT DOCUMENTS

| | | | | |
|---|---|---|---|---|
| 2013/0277546 A1* | 10/2013 | Hallundb k | .............. | G01V 5/08 |
| | | | | 250/269.1 |
| 2016/0168975 A1* | 6/2016 | Donderici | ................ | G01B 7/10 |
| | | | | 324/238 |
| 2016/0305240 A1* | 10/2016 | Fox | ......................... | E21B 47/12 |
| 2017/0362925 A1* | 12/2017 | Zhang | .................... | E21B 47/00 |
| 2019/0226322 A1* | 7/2019 | Khalaj Amineh | ...... | E21B 47/00 |
| 2019/0250060 A1* | 8/2019 | Kawai | .................. | G01M 3/005 |

* cited by examiner

METAL LOSS SEVERITY IN MULTISTRING CONFIGURATIONS USING PIPE INSPECTION TOOLS WITH DEEP AZIMUTHAL SENSITIVITY

TECHNICAL FIELD

This application is directed, in general, to wellbore casing integrity and, more specifically, to a method of evaluating wellbore casing integrity.

BACKGROUND

Currently, electromagnetic pipe corrosion tools measure in an omni-circumferential directional on multiple strings of casing pipe. Therefore, any metal loss or corrosion is modelled in a same way, by averaging results around each pipe circumference. In many cases, corrosion is not consistent and using an omni-directional averaged result may not best represent the severity of a pipe defect or metal loss. As an example, if a defect is measured in an omni-directional manner and modeled in this way, an average corrosion may be calculated to be 15 percent. However, if this metal loss occurs only over 10 degrees of the circumference of the pipe, the severity is actually much higher than 15 percent and may represent a hole in the pipe corresponding to a 100 percent metal loss. This disclosure addresses this inconsistency in both electromagnetic pipe corrosion modeling and measurement.

BRIEF DESCRIPTION

Reference is now made to the following descriptions taken in conjunction with the accompanying drawings, in which.

Figure 3A:
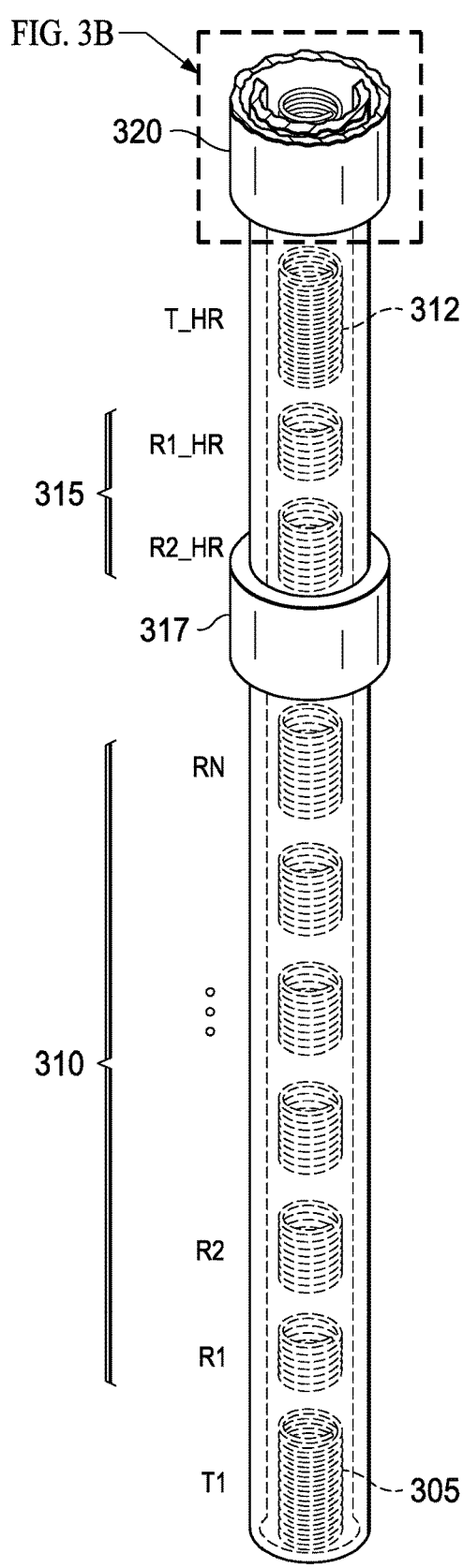
Figure 3B:
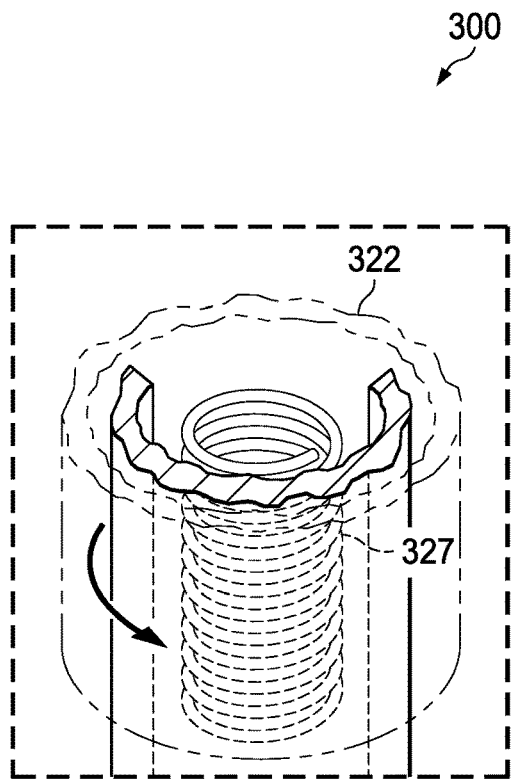
Figure 3C:
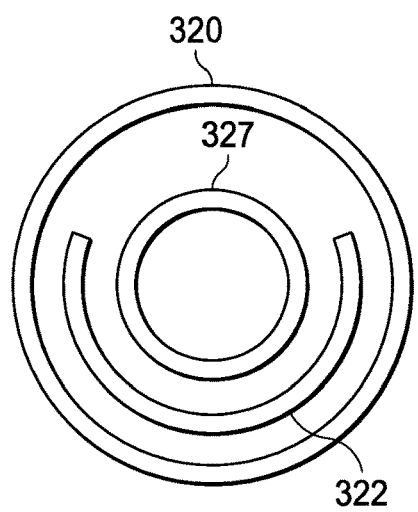
Figure 4A:
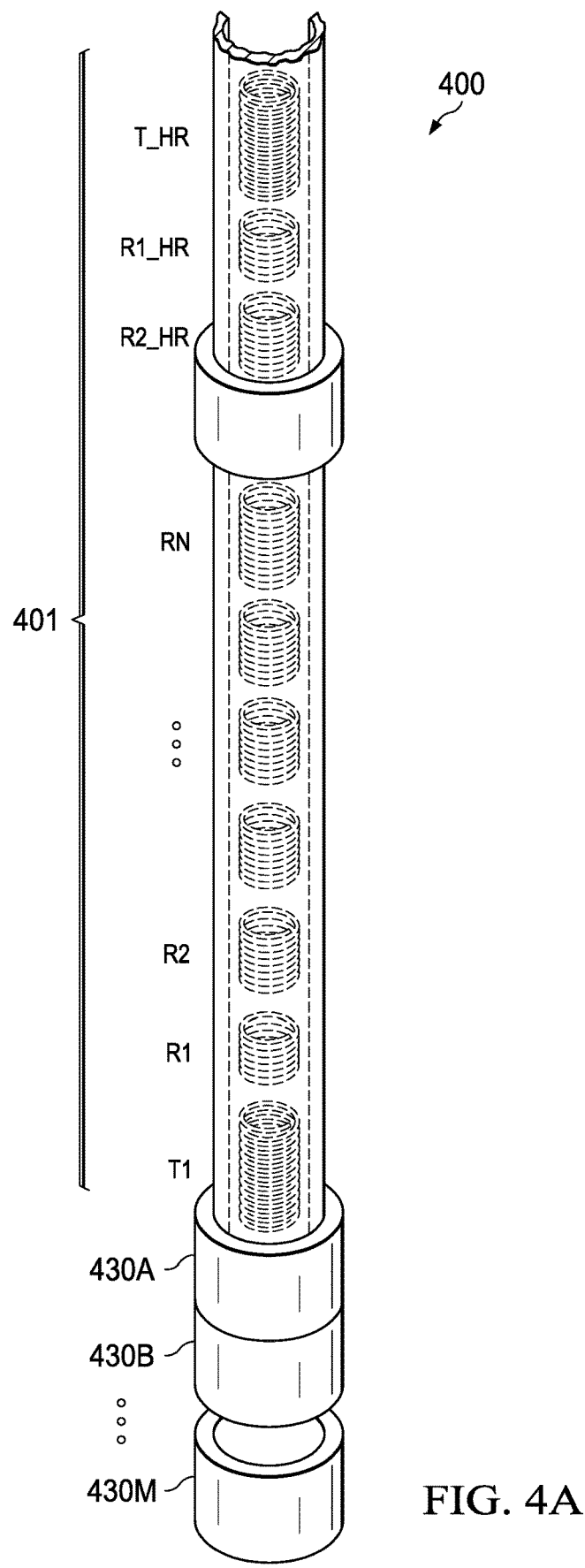
Figure 4B:
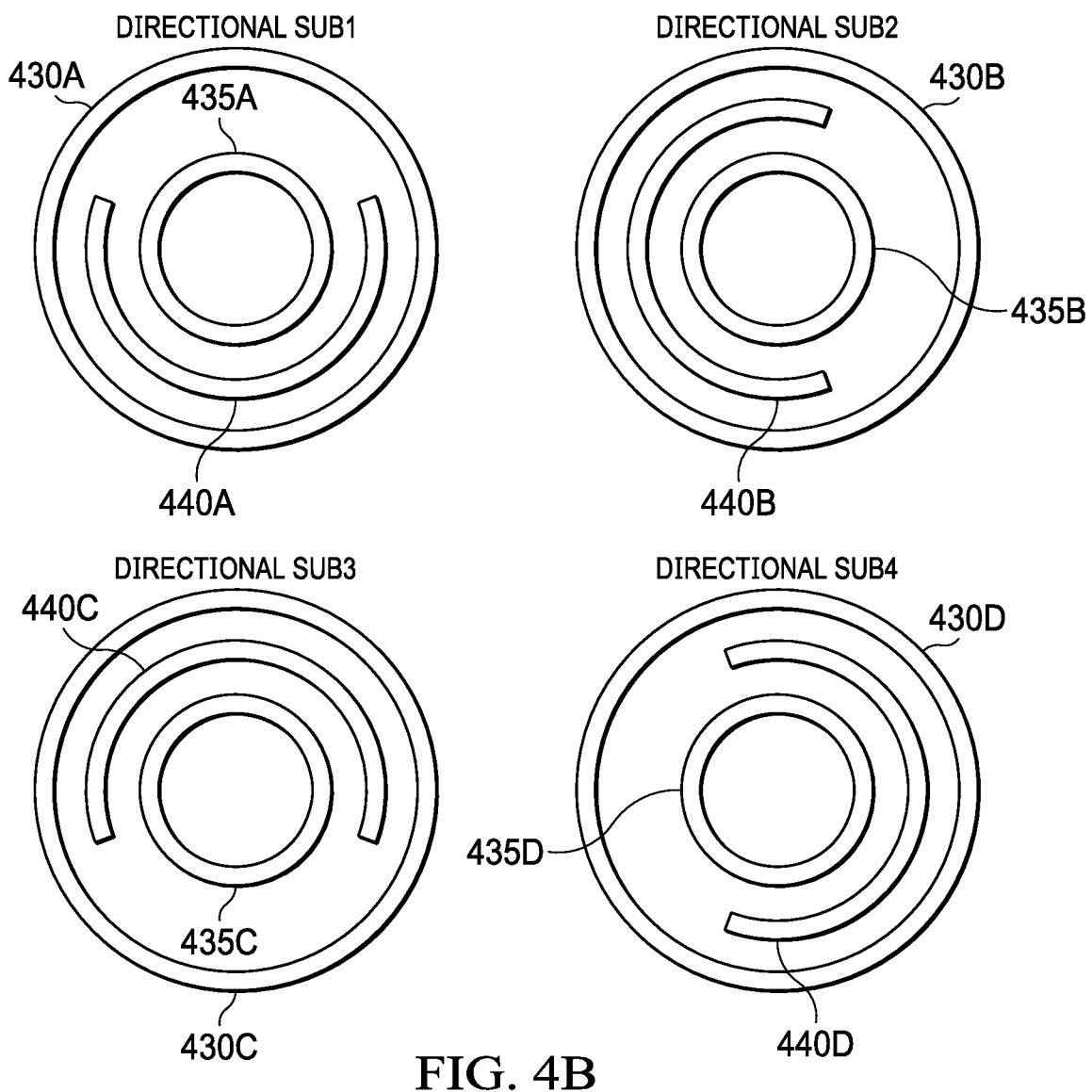
Figure 5A:
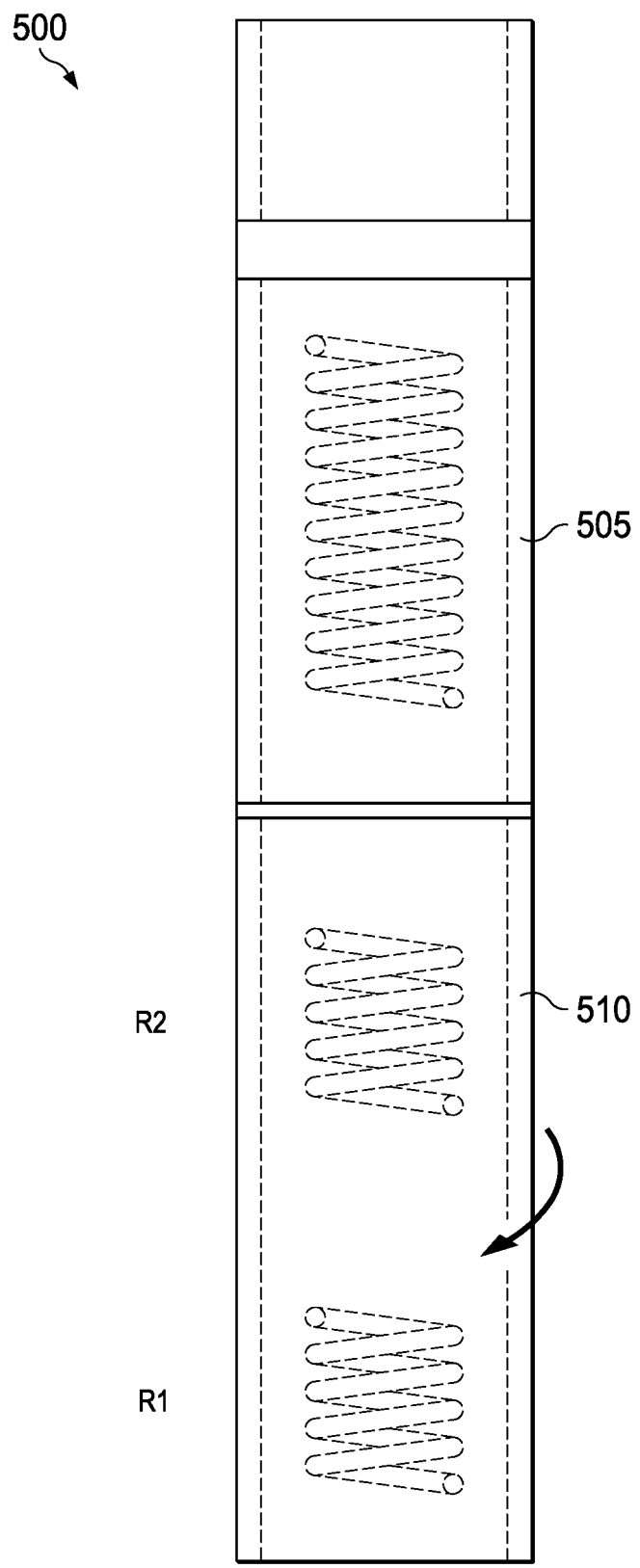
Figure 5B:
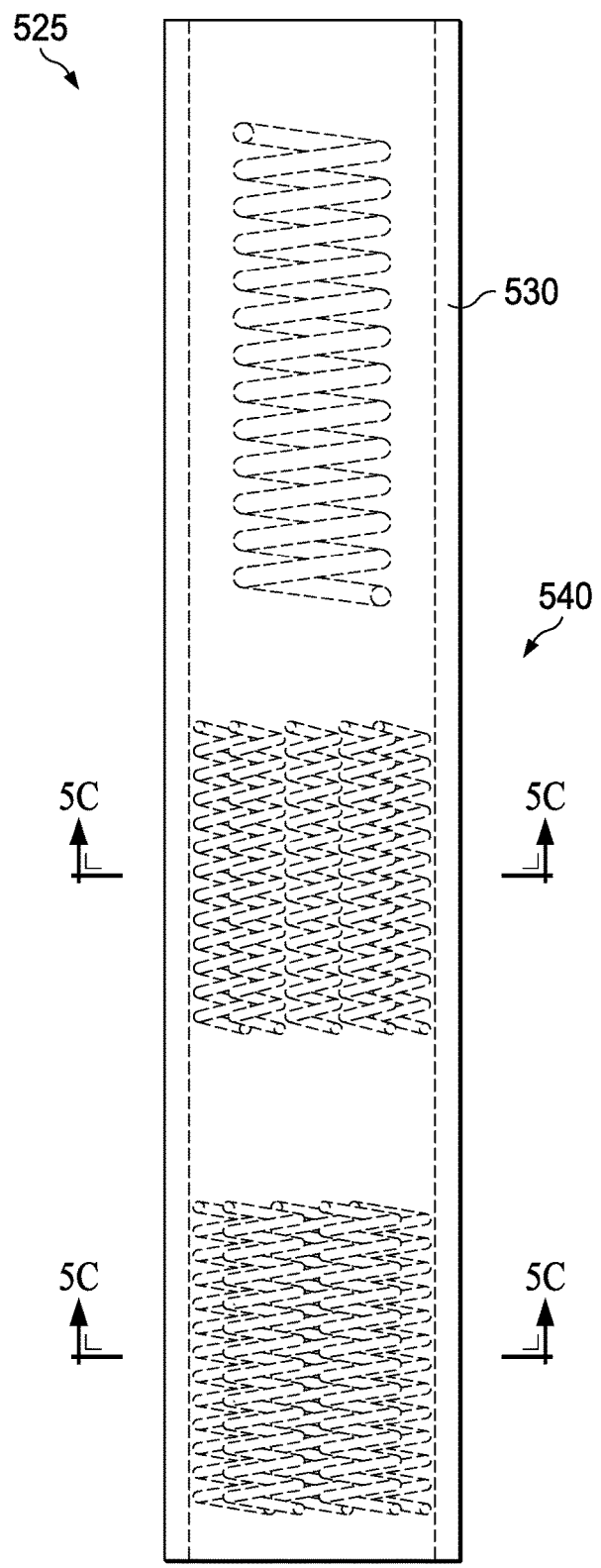
Figure 5C:
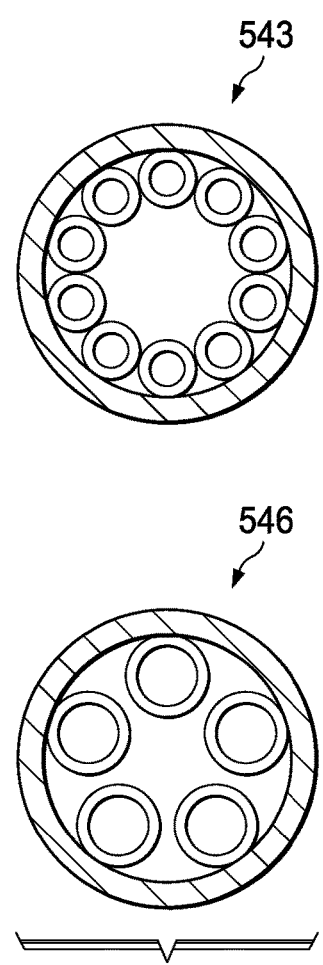
Figure 5D:
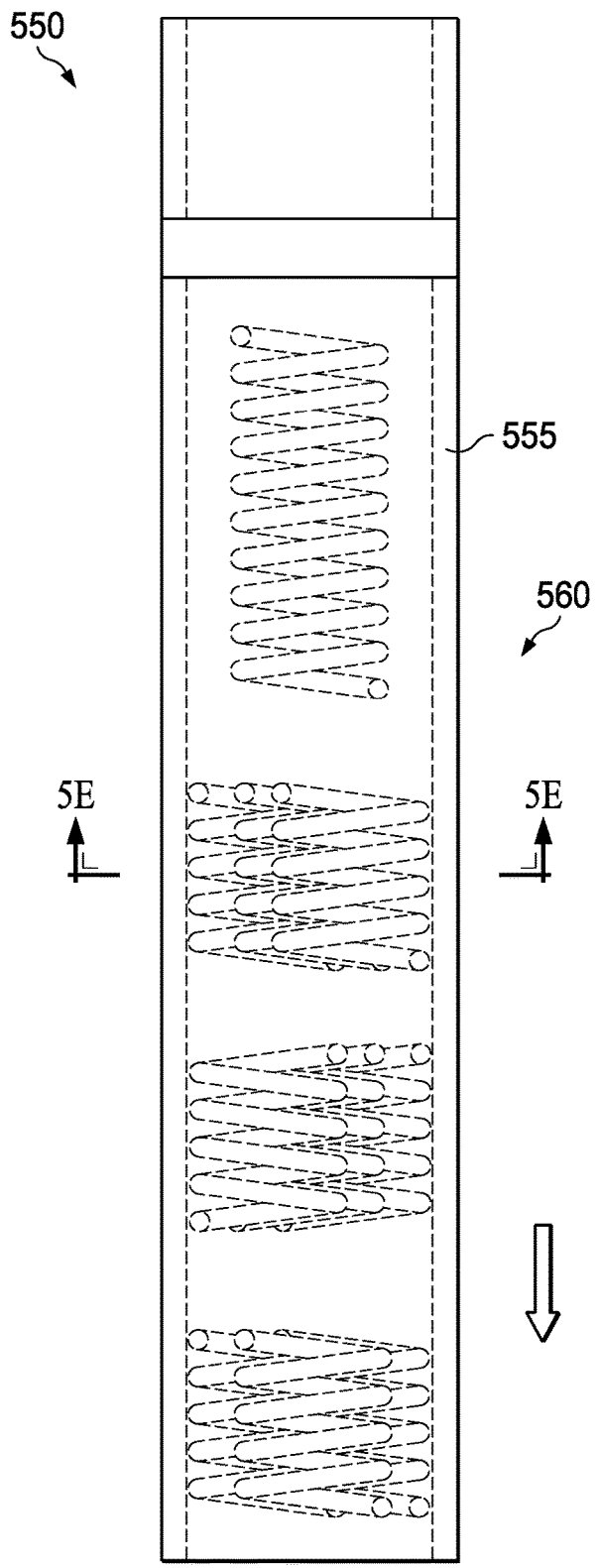
Figure 5E:
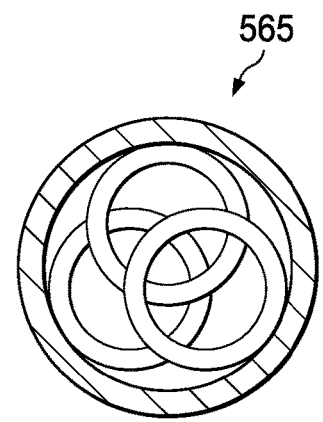
Figure 8:
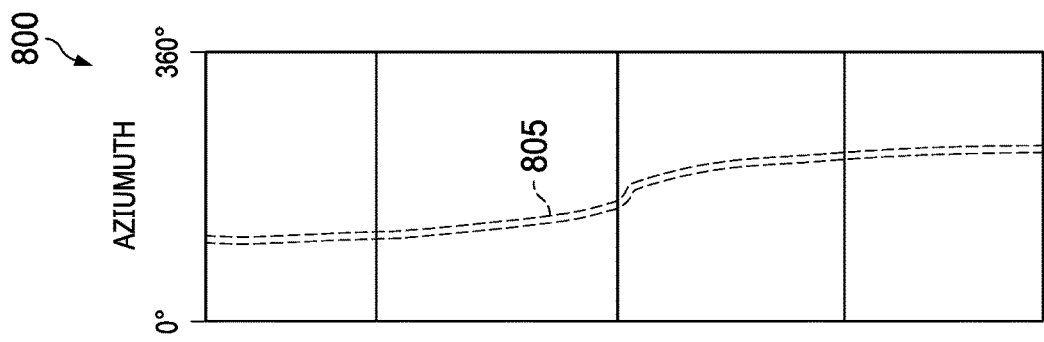
Figure 7:
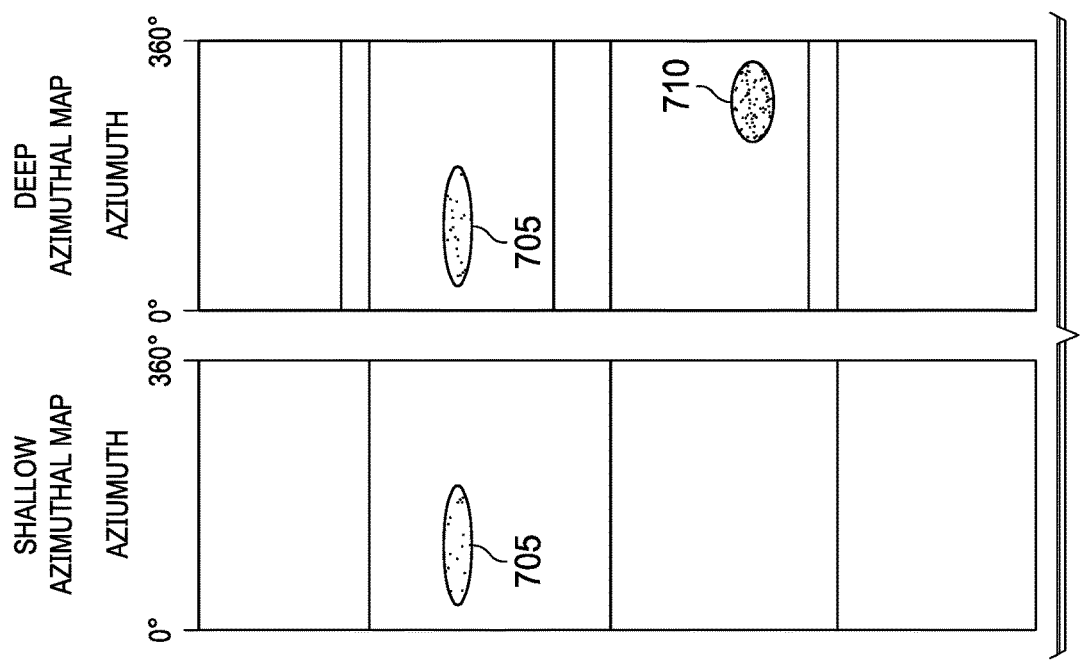
Figure 6:
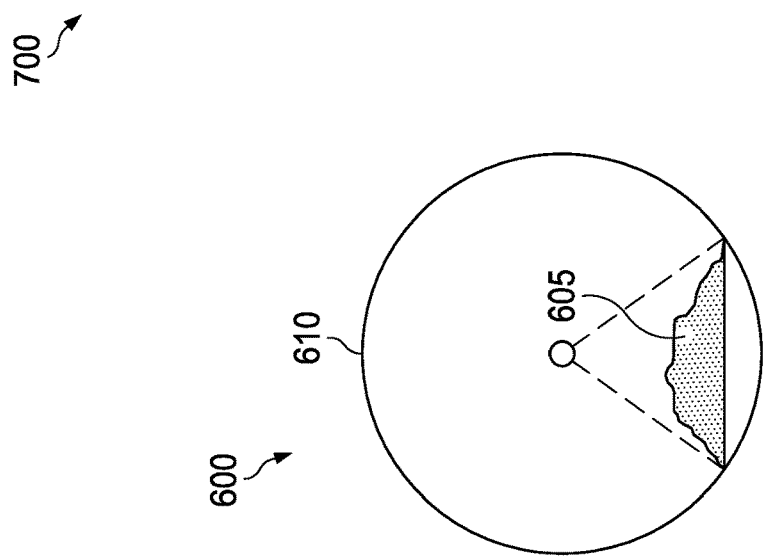
Figure 9:
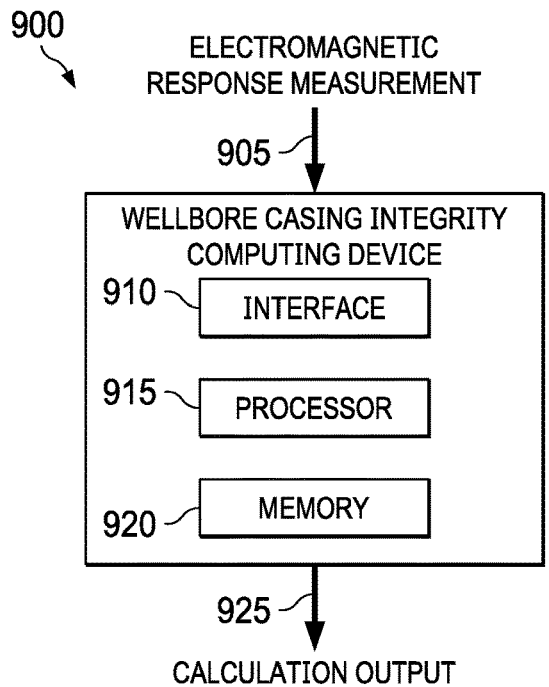
Figure 10:
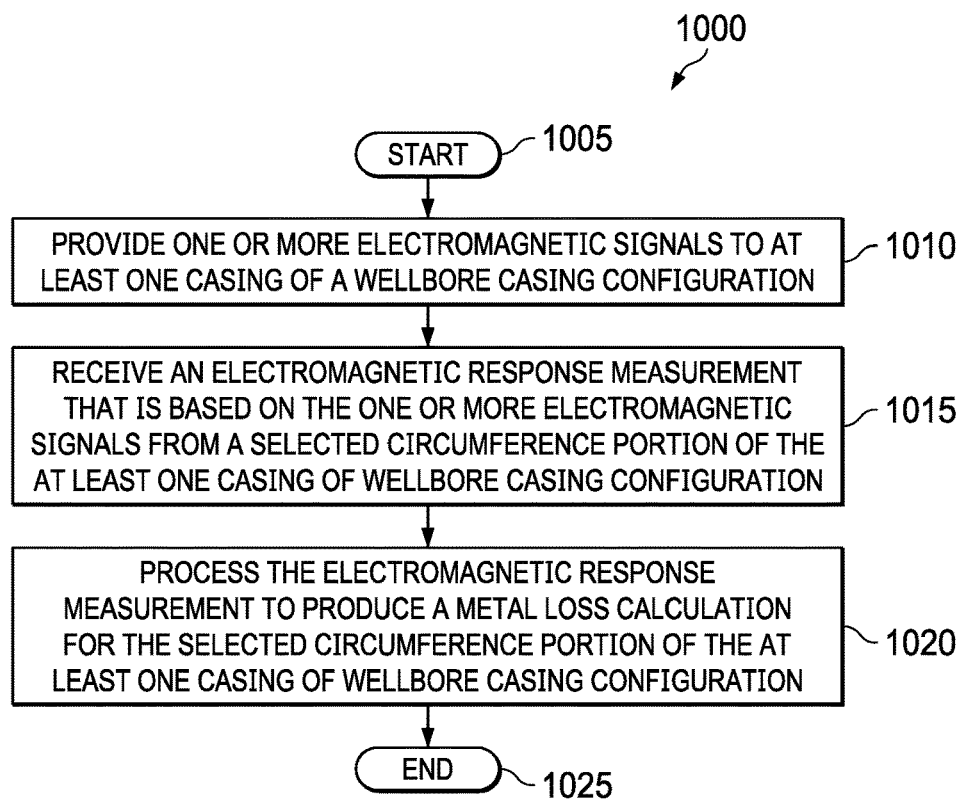

FIGS. 3A, 3B, and 3C illustrate another example of a wellbore casing integrity tool containing a directional sub and constructed according to the principles of the present disclosure;

FIGS. 4A and 4B illustrate yet another example of a wellbore casing integrity tool containing a set of directional subs and constructed according to the principles of the present disclosure;

FIGS. 5A, 5B, and 5D illustrate still other examples of wellbore casing integrity tools constructed according to the principles of the present disclosure;

FIG. 5C illustrates cross sections of the wellbore casing integrity tool of FIG. 5B and FIG. 5E illustrates a cross section of the wellbore casing integrity tool of FIG. 5D;

FIG. 6 illustrates an example of inner circumferential coverage casing or pipe damage as may be provided by a wellbore casing integrity tool constructed according to the principles of the present disclosure;

FIG. 7 illustrates an example of casing or pipe damage shown in an azimuthal damage display constructed according to the principles of the present disclosure;

FIG. 8 illustrates an example of another azimuthal display constructed according to the principles of the present disclosure;

FIG. 9 illustrates an example of a wellbore casing integrity computing device constructed according to principles of the present disclosure; and FIG. 10 illustrates an example of a method of evaluating wellbore casing integrity for a wellbore casing configuration carried out according to principles of the present disclosure.

DETAILED DESCRIPTION

The disclosure provides a wellbore integrity evaluation method, tool and computing device for determining a circumferential casing integrity in a downhole multi-casing configuration of a wellbore. The disclosed approach provides an improvement compared to existing omni-directional approaches by measuring the circumferential extent of metal loss or corrosion for strings of casing pipe, and thereby producing a more representative solution to the problem of metal loss severity or corrosion for casing strings. In particular, the disclosed method, tool and computing device may advantageously save time and costs associated with determining well integrity without having to remove tubing during various well procedures, such as a cement remedial procedure or a cut and pull process at a well abandonment stage.

The improvement can be accomplished in multiple ways using different technologies. For example, a new tool can be used that is multi-directional (as opposed to omni-directional) in accessing information. The multi-directional tool can use an array of receivers that cooperate with one or more electromagnetic transmitters to capture directional information at different depths of investigation. This cooperation of transmitters and receivers may employ multiple or tailored frequencies, receiver spacing and shielding between the transmitters and receivers to focus an electromagnetic investigation of metal loss or corrosion for strings of casing pipe. The shielding is typically constructed of a highly conductive, high magnetic permeability material such that it prevents a shielded side of the tool from receiving any, or at least minimal, signal emanating from the side of casing strings or pipes adjacent to it. A tool sub may also be used that can be linked with an existing electromagnetic pipe corrosion tool or other tools. A tool employing the sub can provide an indication of the circumferential extent of corrosion or metal loss or gain and measure these at different depths of investigation. The different depths of investigation can be used to help distinguish between different corrosion scenarios.

In general, the directional measurements provided in this disclosure can measure metal corrosion directly across a portion of casing circumference. These measurements may employ directional shielding of transmitters or receivers. This, of course, can be tied to frequencies, receiver spacings, phase shifting, and magnitude changes in data based on tool construction. In one approach, tool sensors or transmitters have shielding fixed with respect to certain directions of measurement. Alternately, the shielding may be rotatable thereby giving directionally vectored measurements. Another approach can provide culminated measurements that are based on using multiple coiled sensors co-located at a same point on the tool. A different approach provides an indication or location of metal loss circumferentially along with how far back in the casing strings of pipe the metal loss occurs. These measurements can be accomplished through approaches employing a transmitter that continuously emits a collection of several frequencies, or the transmitter may employ two frequencies (one for shallower effects and one for deeper effects). Shielded or rotating transmitters and receivers can also be employed.

In addition, the disclosed technology may be used in other areas, such as finding cabling on the side of pipe, and may be useful in analyzing buckling or deformation of casing behind other pipe. The disclosed technology may be useful in identifying positions of casing pipes in a wellbore with respect to one another or the earth. The disclosed technology may be useful with ranging or locating other wells nearby or be useful in identifying low side or high side pipeline issues. Additionally, the disclosed technology may be useful in gravel pack structure analysis or metal loss causes as well as helpful with wear analysis of casing or pipe in general.

Figure 1:
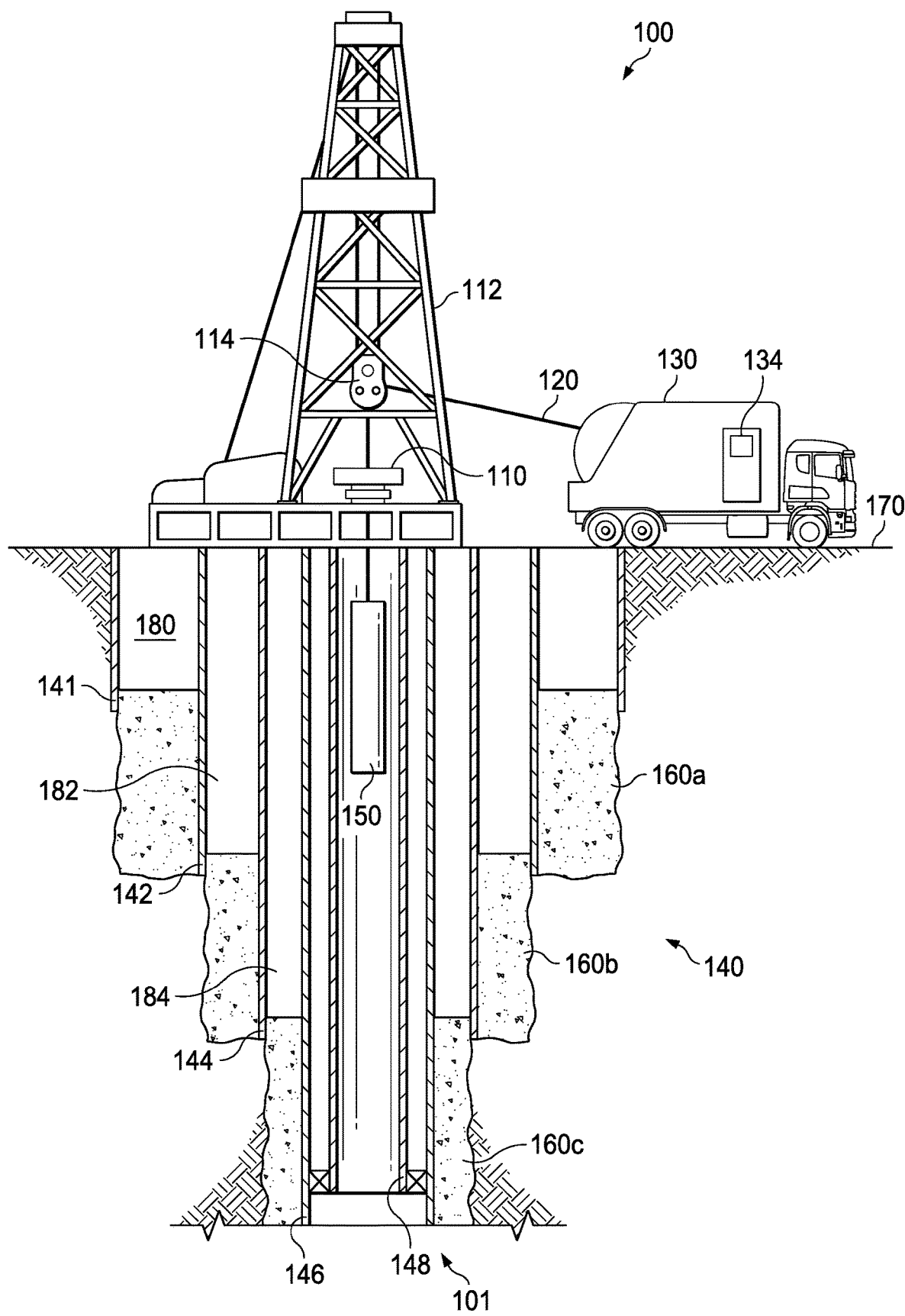
FIG. 1 illustrates a diagram of a wellbore site configured to perform well integrity testing of multiple casing configurations according to the principles of the present disclosure.

FIG. 1 illustrates a diagram of an example of a wellbore site, generally designated 100, constructed according to the principles of the disclosure. The wellbore site 100 is configured to perform well integrity testing of one or multiple casing configurations. The wellbore site 100 includes a wellhead 110, a derrick 112, and a traveling block 114 supported by the derrick 112. The wellbore site 100 further includes a conveyance 120 (such as wireline, slickline, coiled tubing, etc.), a logging facility 130, and a multi-casing or multi-pipe configuration 140. Wellbore site 100 generally includes a wireline tool, such as a probe or a sonde that can be lowered to the bottom of a region of interest in the wellbore 101 and subsequently pulled upward at a substantially constant speed. The wireline tool in wellbore site 100 is a wellbore casing integrity tool 150 as disclosed herein that forms part of a wireline logging operation. While not depicted, the tool 150 can also be deployed in a drilling environment, e.g. as part of a logging while drilling (LWD) operation, such as when a borehole assembly (BHA) is tripping out of the wellbore through a cased portion of the well. The conveyance 120 can be used to raise and lower the wellbore casing integrity tool 150 into and out of the wellbore 101 to gather data for evaluation of the integrity of well casing within the multi-pipe configuration 140. The data obtained by the wellbore casing integrity tool 150 can be communicated to the surface logging facility 130 for storage, processing or analysis. Logging facility 130 may be provided with electronic equipment 134, including computers and/or processors for various types of signal processing and communication of information. One of the computers or processors can be configured to perform the functions of the integrity computing device illustrated in FIG. 9.

The multi-pipe configuration 140 includes multiple casing strings that are set inside the drilled wellbore 101 to protect and support production of hydrocarbons to a surface 170. In addition to providing stabilization and keeping the sides of the wellbore 101 from caving in on themselves, the casing strings can protect hydrocarbon production from outside contaminants and separating any fresh water reservoirs from fluids being produced through the casing. Also known as setting pipe, casing a wellbore 101 includes running pipe (such as steel pipe) down an inside of the recently drilled portion of the wellbore 101. The small space between the casing and the untreated sides of the wellbore 101 (generally referred to as an annulus) can be filled with a well material (such as cement) to permanently set the casing in place. Casing pipe can be run from a floor of the derrick 112, connected one joint at a time, and stabbed into a casing string that was previously inserted into the wellbore 101. The casing is landed when the weight of the casing string is transferred to casing hangers which are positioned proximate the top of the new casing, and can use slips or threads to suspend the new casing in the wellbore 101. A cement slurry can then be pumped into the wellbore 101 and allowed to harden to permanently fix the casing in place. After the cement has hardened, the bottom of the wellbore 101 can be drilled out, and the completion process continued.

Sometimes the wellbore 101 is drilled in stages. For example, wellbore 101 can be drilled to a certain depth, cased and cemented, and then the wellbore 101 is drilled to a deeper depth, cased and cemented again, and so on. Each time the wellbore 101 is cased, a smaller diameter casing is used. The multi-pipe configuration 140 includes a conductor pipe 141, surface casing 142, intermediate casing 144, production casing 146, and production tubing 148. The conductor pipe 141 is the widest type of casing, and is usually about 30 to 42 inches (762 mm to 1,066.8 mm) in diameter for offshore wellbores and 12 to 16 inches (304.8 mm to 406.4 mm) in diameter for onshore wellbores. An annular space (not shown in FIG. 1) radially outside the conductor pipe 141 can be filled with cement to prevent drilling fluids from circulating outside the conductor pipe 141 and causing erosion. The surface casing 142 is the next size in casing strings and can run several thousand feet in length. An annular space 180 radially outside the surface casing 142 can be filled with cement 160a to prevent, for example, hydrocarbon fluids from encroaching into fresh water zones. The intermediate casing 144 is next in diameter size and can be run to separate challenging areas or problem zones, such as areas of high pressure or lost circulation. An annular space 182 radially outside the intermediate casing string 144 can be at least partially filled with cement 160b to, for example, isolate formations which can possibly breakdown and cause a loss of circulation in the wellbore.

Generally, the last type of casing string run into the wellbore 101 is the production casing 146, and is therefore the smallest diameter casing string. The production casing 146 can be run directly into a producing reservoir. An annular space 184 radially outside the production casing 146 can be at least partially filled with cement 160c to, for example, stop hydrocarbons from migrating to thief zones and to prevent sloughing of formations which can cause circulation loss in the wellbore 101. A production string 148 can then be run in the wellbore 101 to produce hydrocarbons from the producing reservoir to the surface 170 and the derrick 112.

As noted above, the wellbore casing integrity tool 150 can be lowered into the wellbore 101 for evaluation of the casing of the multi-pipe configuration 140. The wellbore casing integrity tool 150 employs an electromagnetic approach to evaluate the integrity of wellbore casing within the multi-pipe configuration 140. Examples of the wellbore casing integrity tool 150 are included below.

Figure 2A:
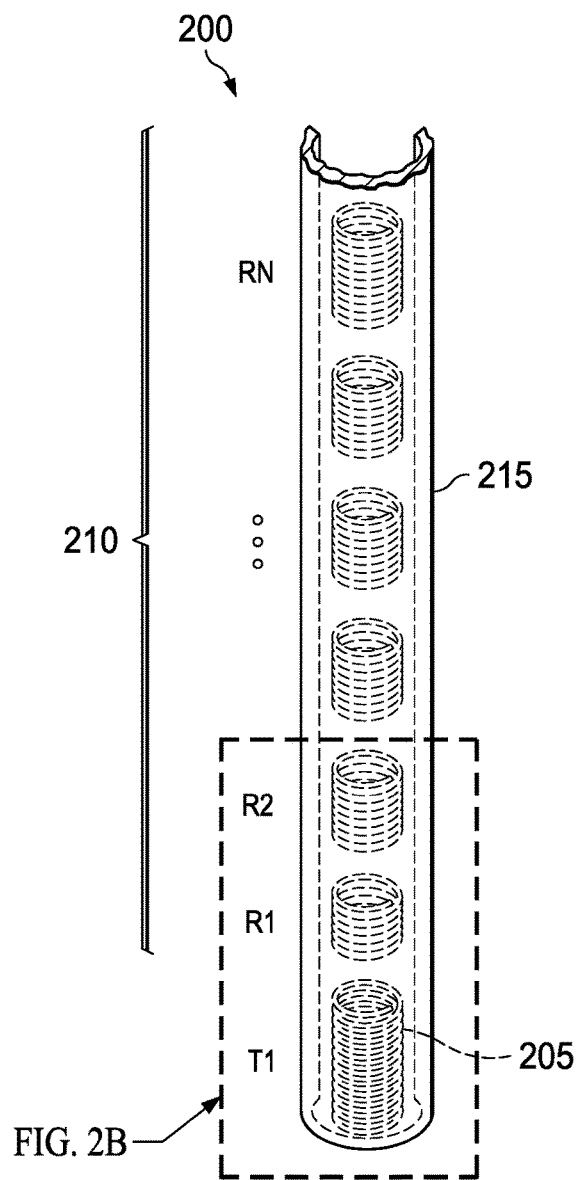
FIG. 2A illustrates an example of a wellbore casing integrity tool constructed according to the principles of the present disclosure.
Figure 2B:
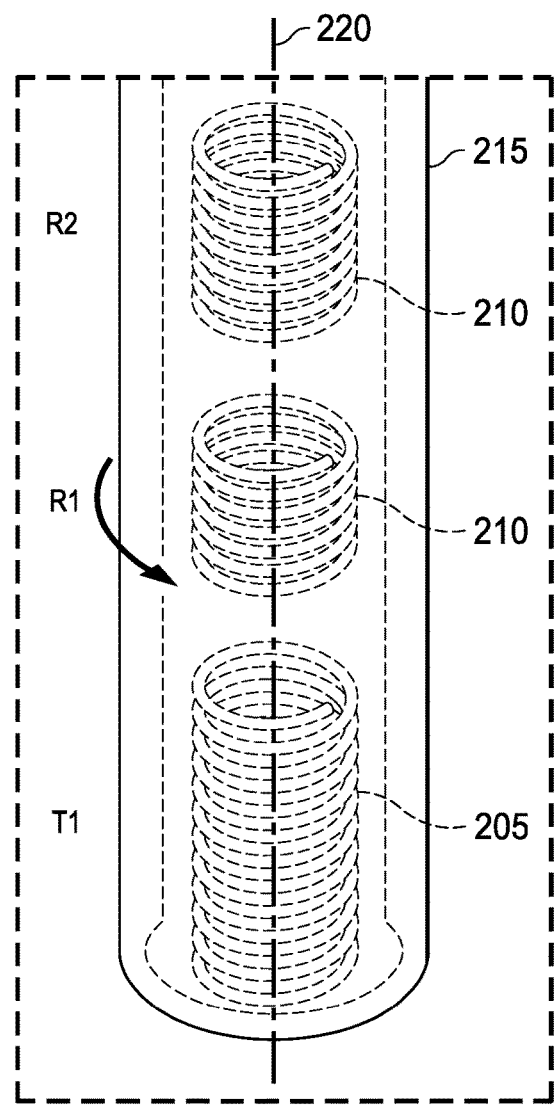
FIG. 2B illustrates a portion of the wellbore casing integrity tool of FIG. 2A.

FIG. 2A illustrates an example of a wellbore casing integrity tool, generally designated 200, constructed according to the principles of the disclosure. The wellbore casing integrity tool 200 illustrates basic casing integrity measurement components that may be employed in the wellbore casing integrity tool 150 of FIG. 1. The wellbore casing integrity tool 200 includes an electromagnetic transmitter (T1) 205, multiple receivers (R1, . . . RN) 210 and a rotatable electromagnetic shield 215. In this example, the wellbore casing integrity tool 200 employs electrical coils for the transmitter 205 and the multiple receivers 210. One or more electromagnetic signals are applied to the transmitter coil 205. This one or more electromagnetic transmitter signals create electrical currents within a multiple casing configuration, such as the multi-pipe configuration 140 of FIG. 1, that in turn provide an electromagnetic response measurement in the multiple receivers 210. The electromagnetic response measurement is proportional to an electrical conductivity in the multiple casing configuration. The electrical conductivity is affected by metal corrosion and defects of the casing of the multiple casing configuration and is reflected in the electromagnetic response measurement of the multiple receivers 210. The multiple receivers 210 provide multiple depths of investigation for the multiple casing configuration due to their increased spacing from the transmitter 205. The rotatable electromagnetic shield 215 focuses the one or more electromagnetic transmitter signals and the electromagnetic response measurement on only a selectable portion of the circumference of the multiple casing configuration. As illustrated in FIG. 2B, the rotatable electromagnetic shield 215 is typically rotated axially around a centerline 220 of a wellbore casing integrity tool (e.g., such as the wellbore casing integrity tool 150 of FIG. 1). The rotatable electromagnetic shield 215 can be rotated by an electric motor or another appropriate rotational driver coupled thereto.

FIGS. 3A, 3B, 3C illustrate another example of a wellbore casing integrity tool, generally designated 300 containing a directional sub and constructed according to the principles of the present disclosure. The wellbore casing integrity tool 300 includes a first transmitter (T1) 305, a first receiver assembly (R1, . . . , RN) 310, a second transmitter (T_HR) 312 (HR indicates high resolution array with shorter transmitter-receiver spacing), a second receiver assembly (R1_HR, R2_HR) 315, an electronics assembly 317 and a directional sub 320. The first transmitter (T1) 305 and the first receiver assembly (R1, . . . , RN) 310, supported by the electronics assembly 317, form a first omni-directional interrogation unit for a multiple casing configuration, as may be employed in the wellbore casing integrity tool 150 of FIG. 1. The second transmitter (T_HR) 312 and the second receiver assembly (R1_HR, R2_HR) 315, supported by the electronics assembly 317, form a second omni-directional interrogation unit for a multiple casing configuration. Typically, the first omni-directional interrogation unit interrogates more deeply into the multiple casing configuration (e.g., the outer casings of the multi-pipe configuration 140 of FIG. 1) but with less casing defect resolution capability than the second omni-directional interrogation unit. The second omni-directional interrogation unit provides higher defect resolution capability with less casing exploration depth of the multiple casing configuration (e.g., the inner casings of the multi-pipe configuration 140 of FIG. 1). Both of these omni-directional measurements average defect information over an entire casing circumference.

The directional sub 320 provides defect interrogation of one or more of the casing strings or pipes for a portion of a circumference as opposed to the entire circumference. This action provides defect averaging over the portion of the circumference thereby greatly increasing defect resolution. FIGS. 3B, 3C show a more detailed view of the directional sub 320. Here, a receiver coil 327 is partly surrounded by a rotatable electromagnetic shield 322. An open or unshielded part of the rotatable electromagnetic shield 322 provides a rotatable measurement window that allows an electromagnetic response measurement to be received by the receiver coil 327. This rotatable measurement window may greatly enhance measurement information as to defect severity and may be further applied to enhance omni-directional information, as appropriate by identifying in which portion of the circumference the defect occurs. As indicated before, the rotatable electromagnetic shield 322 can be rotated by a motor or another appropriate rotational driver coupled thereto.

FIGS. 4A, 4B illustrate yet another example of a wellbore casing integrity tool, generally designated 400, containing a set of directional subs and constructed according to the principles of the present disclosure. The wellbore casing integrity tool 400 includes an omni-direction interrogation section 401 as discussed with respect to FIG. 3 and as may be employed for omni-directional interrogation of a multiple casing configuration, such as by the wellbore casing integrity tool 150 for interrogation of the multi-pipe configuration 140 of FIG. 1. The wellbore casing integrity tool 400 also includes a set of directional subs 430A, . . . , 430M having receiving coils with stationary shields as shown in FIG. 4B. Each of the receiving coils and their stationary shields provide overlapping or non-overlapping measurement windows that allow electromagnetic response measurements focused on selected circumferential portions of one or more casings of the multiple casing configuration.

FIG. 4B shows one example of a four-direction set of directional subs where centers of measurement windows formed by the stationary shields provide both electromagnetic transmission signals and electromagnetic response measurements that are orientated 90 degrees apart with some overlap in the measurement windows. As shown, a first directional sub includes a sub housing 430A, a transmitter/receiver coil 435A and an electromagnetic shield 440A. In similar fashion, a second directional sub includes a sub housing 430B, a transmitter/receiver coil 435B and an electromagnetic shield 440B. Additionally, a third directional sub includes a sub housing 430C, a transmitter/receiver coil 435C and an electromagnetic shield 440C, and a fourth directional sub includes a sub housing 430D, a transmitter/receiver coil 435D and an electromagnetic shield 440D. The sub housing is made of an essentially non-conductive, non-magnetic material that is essentially transparent to electromagnetic signals at the operating frequencies of the tool 400. Of course, other measurement window arrangements or orientation may be employed. Each of the four subs provides focused electromagnetic interrogation transmissions and electromagnetic response measurements that may be independent of or can be coordinated with each other.

FIGS. 5A, 5B, 5D illustrate still other examples of wellbore casing integrity tools generally designated 500, 525, 550, and constructed according to the principles of the disclosure. The wellbore casing integrity tool 500 includes an omni-directional (unshielded) transmitter 505 and a directional (partially shielded) receiver assembly 510 that provides first and second directional receivers R1, R2. The directional receiver assembly 510 is rotatable to allow the first and second directional receivers R1, R2 to receive casing or pipe electromagnetic response measurements from any position around a casing circumference. The first and second directional receivers R1, R2 receive these electromagnetic response measurements from a portion of casing circumferences that is defined by a casing circumference arc corresponding to a measurement window defined by an unshielded portion of the directional (partially shielded) receiver assembly 510. A 360 degree rotation of the receiver assembly 510 provides a more detailed casing damage (or inversely, casing integrity) that is based on a width of the measurement window rather than an average casing damage based on the entire casing circumference. Receiver R1 receives electromagnetic response measurements from inner casing strings (e.g., the inner casings of the multi-pipe configuration 140 of FIG. 1). Conversely, receiver R2 receives electromagnetic response measurements from outer casing strings (e.g., the outer casings of the multi-pipe configuration 140 of FIG. 1).

The wellbore casing integrity tool 525 includes an omnidirectional transmitter 530 and an unshielded receiver assembly 540. As illustrated in FIG. 5C, the receiver assembly 540 includes a first culminated receiver 543 and a second culminated receiver 546 that are unshielded. The receiver assembly 540 provides concurrent reception from circumference arcs of one or more casings. The first culminated receiver 543 includes a set of smaller diameter and possibly axially-shorter receiving coils spaced around the directional receiver assembly 540, as shown. Correspondingly, the second culminated receiver 546 includes a set of larger diameter and possibly axially-longer receiving coils spaced around the directional receiver assembly 540, as shown. The smaller diameter receiving coils of the first culminated receiver 543 receive electromagnetic response measurements primarily from inner casing strings, and the larger diameter receiving coils of the second culminated receiver 546 receive electromagnetic response measurements primarily from outer casing strings. The first and second culminated receivers 543, 546 provide different measurement windows that are based on their respective smaller and larger diameter receiving coils. Additionally, both of the first and second culminated receivers 543, 546 receive their electromagnetic response measurements concurrently.

The wellbore casing integrity tool 550 includes an omnidirectional transmitter 555 and an omnidirectional receiver assembly 560. As illustrated in FIG. 5E, the receiver assembly 560 includes a set of stacked and partially shielded receivers 565. Each of the partially shielded receivers 565 concurrently receives electromagnetic response measurements from a separate circumference arc of one or more casings. A composite frequency transmission from the omnidirectional transmitter 555 provides separation of inner and outer casing responses.

FIG. 6 illustrates an example of circumferential coverage of casing or pipe damage, generally designated 600, as may be provided by a wellbore casing integrity tool constructed according to the principles of the present disclosure. A circumferential coverage damage profile 605 may be seen to exist over only about 20 percent of a host casing or pipe 610. The circumferential coverage damage profile 605 indicates much more severe casing or pipe damage than would be represented by an average damage assigned to the circumference of an entire casing or pipe.

FIG. 7 illustrates an example of a damage area for a casing or pipe shown in an azimuthal damage display, generally designated 700, constructed according to the principles of the present disclosure. The azimuthal damage display 700 shows a localized defect area 705 that is indicated in both a shallow azimuthal mapping and a deep azimuthal mapping. This may indicate that the defect area 705 represents a damage or hole in an inner casing or both inner and outer casings. Another localized defect area 710 is indicated in the deep azimuthal mapping that may represent an outer casing defect. Since the localized defect area 710 does not appear in the shallow azimuthal mapping and is smaller in area than the localized defect area 705, it may indicate a smaller area of metal loss in the outer casing.

FIG. 8 illustrates another azimuthal display, generally designated 800, constructed according to the principles of the present disclosure. The azimuthal display 800 shows the position of a cable 805 residing behind casing in a wellbore. The cable 805 may be a wellbore communications cable that is employed to convey downhole signals to the surface or control signals downhole, for example. The capability to accurately locate downhole cabling may prove valuable in maintaining or sustaining wellbore operations.

FIG. 9 illustrates an example of a wellbore casing integrity computing device, generally designated 900, constructed according to principles of the present disclosure. The wellbore casing integrity computing device 900 includes an interface 910, a processor 915, and a memory 920. The interface 910 receives electromagnetic response measurements that have been gathered from a wellbore. The electromagnetic response measurements can originate from one or more casings of a multiple casing configuration, and can be based on one or more interrogation electromagnetic signal transmissions.

The processor 915 may be a wellsite processor as part of a wellbore casing integrity computing device located at a wellsite. Or, the processor 915 may be a data center processor. In either case, the processor 915 is configured, i.e., designed and constructed, to provide a metal loss calculation for the wellbore casings of the multiple casing configuration based on the electromagnetic response measurements. After being received, the electromagnetic response measurements can be stored in a memory such as the memory 920. In one example, the processor 915 computes the metal loss calculation for a selected circumference portion of the one or more casings of the multiple casing configuration. The selected circumference portion of the casings of the multiple casing configuration may correspond to a measurement window of less than 90 degrees of casing circumference. Of course, the selected circumference portion of the casings may be varied to match specific wellbore application requirements. In another example, the processor 915 provides the metal loss calculation as a casing weight loss value for a defective area. In yet another example, the processor 915 employs the casing weight loss value to provide a percent metal loss severity for the defective area. In still another example, the processor employs the percent metal loss severity to calculate a metal thickness for the defective area. These calculations are typically stored in the memory 920 and provided as an output, as required.

FIG. 10 illustrates an example of a method of evaluating wellbore casing integrity, generally designated 1000, carried out according to principles of the disclosure. The method 1000 starts in a step 1005. One or more electromagnetic signals are then provided to at least one casing of a wellbore casing configuration, in a step 1010. In a step 1015, an electromagnetic response measurement that is based on the one or more electromagnetic signals is received from a selected circumferential portion of the at least one casing of the wellbore casing configuration. A wellbore casing integrity tool such as disclosed herein can both provide the electromagnetic signals and receive the electromagnetic response measurement. The electromagnetic response measurement is processed to produce a metal loss calculation for the selected circumferential portion of the at least one casing of the wellbore casing configuration, in a step 1020. A wellbore casing integrity computing device can perform the processing to determine the metal loss calculation.

In one example, providing the one or more electromagnetic signals corresponds to an omni-directional transmission and receiving the electromagnetic response measurement corresponds to a directional reception from the selected circumferential portion of the at least one casing of the wellbore casing configuration. In another example, providing the one or more electromagnetic signals corresponds to a directional transmission and receiving the electromagnetic response measurement corresponds to a directional reception from the selected circumferential portion of the at least one casing of the wellbore casing configuration. In yet another example, providing the one or more electromagnetic signals corresponds to a directional transmission and receiving the electromagnetic response measurement corresponds to an omni-directional reception from the selected circumferential portion of the at least one casing of the wellbore casing configuration.

In still another example, receiving the electromagnetic response measurement corresponds to a directional reception from the selected circumferential portion of the at least one casing of the wellbore casing configuration that is used to correct omni-directional reception data for the at least one casing of the wellbore casing configuration. In a further example, the selected circumferential portion of the at least one casing of the wellbore casing configuration is a continuous circumferential casing section. In still a further example, the selected circumferential portion of the at least one casing of the wellbore casing configuration includes a plurality of circumferential casing sections of the at least one casing of the wellbore casing configuration. Correspondingly, the plurality of circumferential casing sections may include overlapping circumferential casing sections. In yet a further example, the one or more electromagnetic signals provide a single frequency signal or a composite frequency signal having multiple frequencies. Correspondingly, the electromagnetic response measurement may correspond to eddy currents generated in the at least one casing of the wellbore casing configuration by the one or more electromagnetic signals. The method 1000 ends in a step 1025.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The description and drawings included herein are intended to illustrate the principles of the present disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be for pedagogical purposes to aid the reader in understanding the principles of the disclosure and concepts contributed by the inventor to furthering the art, and are to be construed as being without limitation to such specifically recited examples and conditions. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated. Furthermore, directional terms, such as "above", "below", "upper", "lower", etc., are used only for convenience in referring to the accompanying drawings. Additionally, it is to be understood that the different embodiments of the present disclosure may be utilized in various orientations, such as inclined, inverted, horizontal, vertical, etc., and in various configurations, without departing from the principles of the present disclosure.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

Aspects disclosed herein include:

A. A method of evaluating wellbore casing integrity for a wellbore casing configuration, including (1) providing one or more electromagnetic signals to at least one casing of the wellbore casing configuration, (2) receiving an electromagnetic response measurement that is based on the one or more electromagnetic signals from a selected circumferential portion of the at least one casing of the wellbore casing configuration, and (3) processing the electromagnetic response measurement to produce a metal loss calculation for the selected circumferential portion of the at least one casing of the wellbore casing configuration.

B. A wellbore casing integrity tool, including (1) an integrity signal transmitter configured to transmit one or more electromagnetic signals to a selected one or more wellbore casing circumferential portions, and (2) an integrity signal receiver configured to receive an electromagnetic response measurement from the selected one or more wellbore casing circumferential portions based on the transmitted one or more electromagnetic signals.

C. A wellbore casing integrity computing device, including (1) an interface configured to accept a directional electromagnetic response measurement from a selected circumferential portion of at least one wellbore casing that is based on one or more electromagnetic signal transmissions, and (2) a processor configured to provide a metal loss calculation for the selected circumferential portion of the at least one wellbore casing.

Each of aspects A, B, and C can have one or more of the following additional elements in combination:

Element 1: wherein providing the one or more electromagnetic signals corresponds to an omni-directional transmission and receiving the electromagnetic response measurement corresponds to a directional reception from the selected circumferential portion of the at least one casing of the wellbore casing configuration. Element 2: wherein providing the one or more electromagnetic signals corresponds to a directional transmission and receiving the electromagnetic response measurement corresponds to a directional reception from the selected circumferential portion of the at least one casing of the wellbore casing configuration. Element 3: wherein providing the one or more electromagnetic signals corresponds to a directional transmission and receiving the electromagnetic response measurement corresponds to an omni-directional reception from the selected circumferential portion of the at least one casing of the wellbore casing configuration. Element 4: wherein receiving the electromagnetic response measurement corresponds to a directional reception from the selected circumferential portion of the at least one casing of the wellbore casing configuration that is used to correct omni-directional reception data for the at least one casing of the wellbore casing configuration. Element 5: wherein the selected circumferential portion of the at least one casing of the wellbore casing configuration is a continuous circumferential casing section. Element 6: wherein the selected circumferential portion of the at least one casing of the wellbore casing configuration includes a plurality of circumferential casing sections of the at least one casing of the wellbore casing configuration. Element 7: wherein the plurality of circumferential casing sections includes overlapping circumferential casing sections. Element 8: wherein the one or more electromagnetic signals provide a single frequency signal or a composite frequency signal having multiple frequencies. Element 9: wherein the electromagnetic response measurement corresponds to eddy currents generated in the at least one casing of the wellbore casing configuration by the one or more electromagnetic signals. Element 10: wherein the integrity signal transmitter is configured to transmit the one or more electromagnetic signals omni-directionally and the integrity signal receiver is configured to receive the electromagnetic response measurement directionally from the selected one or more wellbore casing circumferential portions. Element 11: wherein the integrity signal transmitter is configured to transmit the one or more electromagnetic signals directionally and the integrity signal receiver is configured to receive the electromagnetic response measurement directionally from the selected one or more wellbore casing circumferential portions. Element 12: wherein the integrity signal transmitter is configured to transmit the one or more electromagnetic signals directionally and the integrity signal receiver is configured to receive the electromagnetic response measurement omni-directionally from the selected one or more wellbore casing circumferential portions. Element 13: wherein the one or more electromagnetic signals provide a single frequency signal or a composite frequency signal having multiple frequencies. Element 14: wherein the composite frequency signal is employed for concurrent integrity testing of at least a portion of a wellbore casing configuration. Element 15: wherein the electromagnetic response measurement is generated by eddy currents in one or more casings of a wellbore casing configuration. Element 16: wherein the integrity signal receiver includes multiple receiving sections that are spaced along a surface of the wellbore casing integrity tool to receive the electromagnetic response measurement from the selected one or more wellbore casing circumferential portions. Element 17: further comprising a shielding structure that limits reception of an unwanted response from outside of the selected one or more wellbore casing circumferential portions. Element 18: wherein the shielding structure employs a rotatable electromagnetic shield or one or more fixed electromagnetic shields to limit reception of the unwanted response. Element 19: further comprising more than one integrity signal transmitter and corresponding integrity signal receiver combination. Element 20: wherein one transmitter and receiver combination interrogates inner wellbore casing strings and another transmitter and receiver combination interrogates outer wellbore casing strings. Element 21: wherein the integrity signal receiver employs one or more culminated receivers. Element 22: wherein the integrity signal receiver employs one or more stacked and shielded receivers. Element 23: wherein the electromagnetic response measurement corresponds to an omni-directional reception that includes the selected circumferential portion. Element 24: wherein the metal loss calculation is provided as a casing weight loss value for a defective area. Element 25: wherein the casing weight loss value is employed to provide a percent metal loss severity for the defective area. Element 26: wherein the percent metal loss severity is employed to calculate a metal thickness for the defective area. Element 27: wherein the processor is a wellsite processor or a data center processor.

What is claimed is:

1. A method of evaluating wellbore casing integrity for a wellbore casing configuration, comprising:
providing one or more electromagnetic signals to at least one casing of the wellbore casing configuration;
receiving at least two separate electromagnetic response measurements at a same time that are based on the one or more electromagnetic signals from a selected circumferential portion of the at least one casing of the wellbore casing configuration while limiting reception of an electromagnetic response measurement from outside of the selected circumferential portion of the at least one casing of the wellbore casing configuration; and
processing the electromagnetic response measurement to produce a metal loss calculation for the selected circumferential portion of the at least one casing of the wellbore casing configuration.

2. The method as recited in claim 1 wherein providing the one or more electromagnetic signals corresponds to an omni-directional transmission and receiving the electromagnetic response measurements corresponds to a directional reception from the selected circumferential portion of the at least one casing of the wellbore casing configuration.

3. The method as recited in claim 1 wherein providing the one or more electromagnetic signals corresponds to a directional transmission and receiving the electromagnetic response measurements corresponds to a directional reception from the selected circumferential portion of the at least one casing of the wellbore casing configuration.

4. The method as recited in claim 1 wherein providing the one or more electromagnetic signals corresponds to a directional transmission and receiving the electromagnetic response measurements corresponds to an omni-directional reception from the selected circumferential portion of the at least one casing of the wellbore casing configuration.

5. The method as recited in claim 1 wherein receiving the electromagnetic response measurements corresponds to a directional reception from the selected circumferential portion of the at least one casing of the wellbore casing configuration that is used to correct omni-directional reception data for the at least one casing of the wellbore casing configuration.

6. The method as recited in claim 1 wherein the selected circumferential portion of the at least one casing of the wellbore casing configuration is a continuous circumferential casing section.

7. The method as recited in claim 1 wherein the selected circumferential portion of the at least one casing of the wellbore casing configuration includes a plurality of circumferential casing sections of the at least one casing of the wellbore casing configuration.

8. The method as recited in claim 7 wherein the plurality of circumferential casing sections includes overlapping circumferential casing sections.

9. A wellbore casing integrity tool, comprising:
an integrity signal transmitter configured to transmit one or more electromagnetic signals to a selected one or more wellbore casing circumferential portions;
at least two separate integrity signal receivers each configured to receive a separate electromagnetic response measurement at a same time from the selected one or more wellbore casing circumferential portions based on the transmitted one or more electromagnetic signals; and
a shielding structure that limits reception of a response measurement by the integrity signal receiver from outside of the selected one or more wellbore casing circumferential portions while allowing the response measurement from the selected one or more wellbore circumferential portions to be received by the integrity signal receiver.

10. The tool as recited in claim 9 wherein the integrity signal transmitter is configured to transmit the one or more electromagnetic signals omni-directionally and the integrity signal receivers are configured to receive the electromagnetic response measurement directionally from the selected one or more wellbore casing circumferential portions.

11. The tool as recited in claim 9 wherein the integrity signal transmitter is configured to transmit the one or more electromagnetic signals directionally and the integrity signal receivers are configured to receive the electromagnetic response measurement directionally from the selected one or more wellbore casing circumferential portions.

12. The tool as recited in claim 9 wherein the integrity signal transmitter is configured to transmit the one or more electromagnetic signals directionally and the integrity signal receivers are configured to receive the electromagnetic response measurement omni-directionally from the selected one or more wellbore casing circumferential portions.

13. The tool as recited in claim 9 wherein the one or more electromagnetic signals provide a single frequency signal or a composite frequency signal having multiple frequencies.

14. The tool as recited in claim 13 wherein the composite frequency signal is employed for concurrent integrity testing of at least a portion of a wellbore casing configuration.

15. The tool as recited in claim 9 wherein the electromagnetic response measurement is generated by eddy currents in one or more casings of a wellbore casing configuration.

16. The tool as recited in claim 9 wherein each integrity signal receiver includes multiple receiving sections that are spaced along a surface of the wellbore casing integrity tool to receive the electromagnetic response measurement from the selected one or more wellbore casing circumferential portions.

17. The tool as recited in claim 9 wherein the shielding structure employs a rotatable electromagnetic shield or one or more fixed electromagnetic shields to limit reception of the unwanted response while allowing response from the selected one or more wellbore circumferential portions to be received.

18. The tool as recited in claim 9 further comprising more than one integrity signal transmitter and corresponding integrity signal receiver combination, wherein one transmitter and receiver combination interrogates inner wellbore casing strings and another transmitter and receiver combination interrogates outer wellbore casing strings.

19. The tool as recited in claim 9 wherein the integrity signal receiver employs one or more culminated receivers, or employs one or more stacked and shielded receivers.

20. A wellbore casing integrity computing device, comprising:
an interface configured to accept at least two separate directional electromagnetic response measurements at a same time from a selected circumferential portion of at least one wellbore casing that is based on one or more electromagnetic signal transmissions;
a shielding structure that limits reception of electromagnetic response measurements from outside of the selected circumferential portion of the at least one wellbore casing while allowing the interface to accept the directional electromagnetic response measurement from the selected circumferential portion of the at least one wellbore casing; and
a processor configured to provide a metal loss calculation for the selected circumferential portion of the at least one wellbore casing.

21. The computing device as recited in claim 20 wherein the electromagnetic response measurements correspond to an omni-directional reception that includes the selected circumferential portion.

22. The computing device as recited in claim 20 wherein the metal loss calculation is provided as a casing weight loss value for a defective area, the casing weight loss value is employed to provide a percent metal loss severity for the defective area, and the percent metal loss severity is employed to calculate a metal thickness for the defective area.

* * * * *